United States Patent
Fujimori

(10) Patent No.: US 7,573,878 B2
(45) Date of Patent: Aug. 11, 2009

(54) NETWORK CONTROL DEVICE AND CONTROL METHOD AND PROGRAM THEREOF

(75) Inventor: Takashi Fujimori, Kanagawa (JP)

(73) Assignee: NEC Electronics Corporation (JP)

( * ) Notice: Subject to any disclaimer, the term of this patent is extended or adjusted under 35 U.S.C. 154(b) by 933 days.

(21) Appl. No.: 10/691,829

(22) Filed: Oct. 23, 2003

(65) Prior Publication Data
US 2004/0081178 A1 Apr. 29, 2004

(30) Foreign Application Priority Data
Oct. 25, 2002 (JP) ............................. 2002-311529

(51) Int. Cl.
H04L 12/28 (2006.01)
(52) U.S. Cl. ...................................... 370/392; 370/401
(58) Field of Classification Search ........................ None
See application file for complete search history.

(56) References Cited

U.S. PATENT DOCUMENTS 7,356,001 B1 * 4/2008 Jones et al. .................. 370/331
2002/0055985 A1 * 5/2002 Saino et al. .................. 709/219
2003/0036392 A1 * 2/2003 Yukie .......................... 455/461

FOREIGN PATENT DOCUMENTS

JP 11-215174 8/1999

* cited by examiner

Primary Examiner—Ronald Abelson
Assistant Examiner—Jung Park
(74) Attorney, Agent, or Firm—Ostrolenk, Faber, LLP

(57) ABSTRACT

A system including sub-networks mounted with different kinds of protocols/profiles, a gate way/proxy for connecting the sub-networks, and nodes on the sub-networks, the gateway/proxy being mounted with processing of a physical layer and a data link layer as a protocol of the sub-network and having a common transport layer and a service proxy and a client proxy shared by the sub-networks.

29 Claims, 14 Drawing Sheets

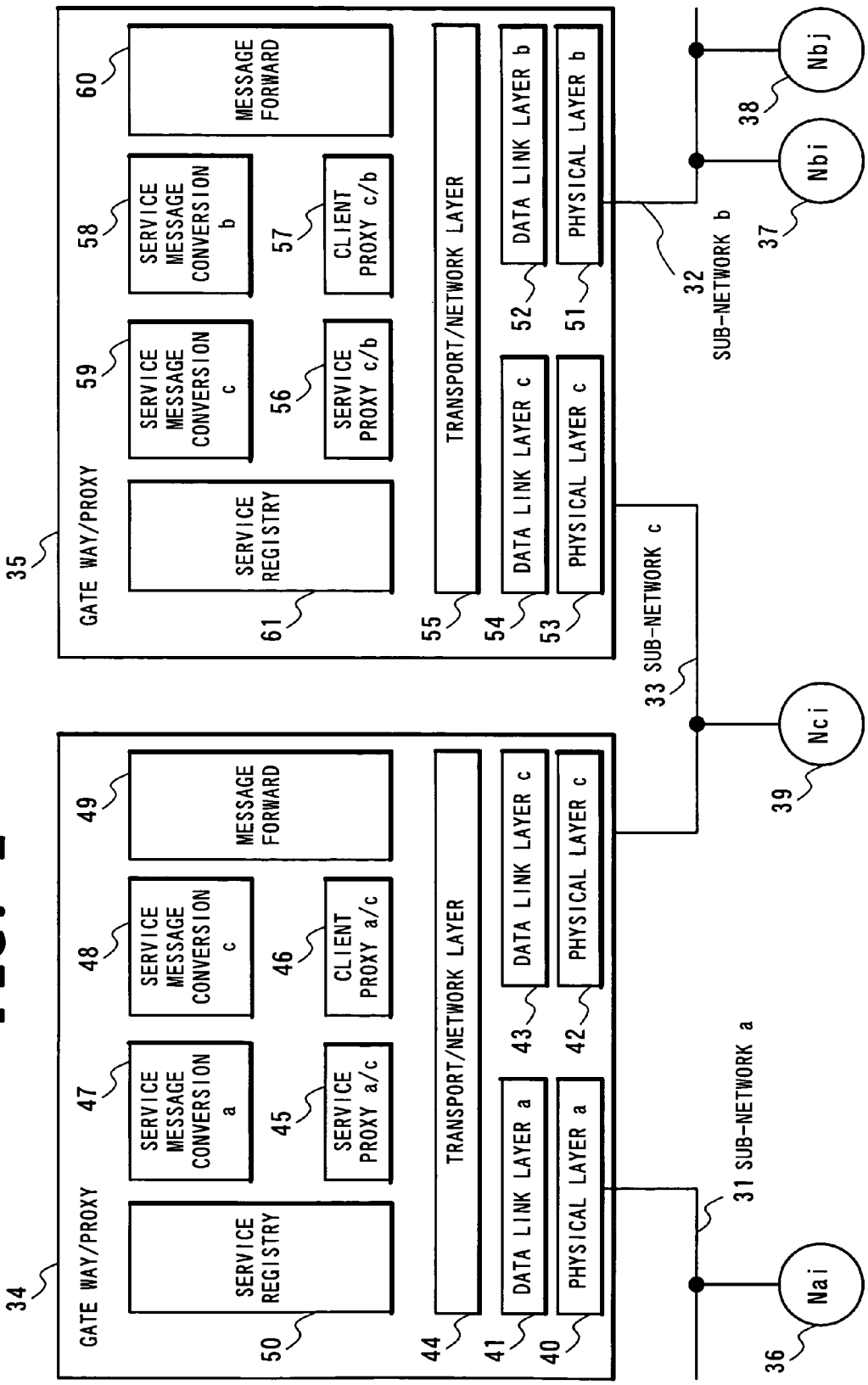

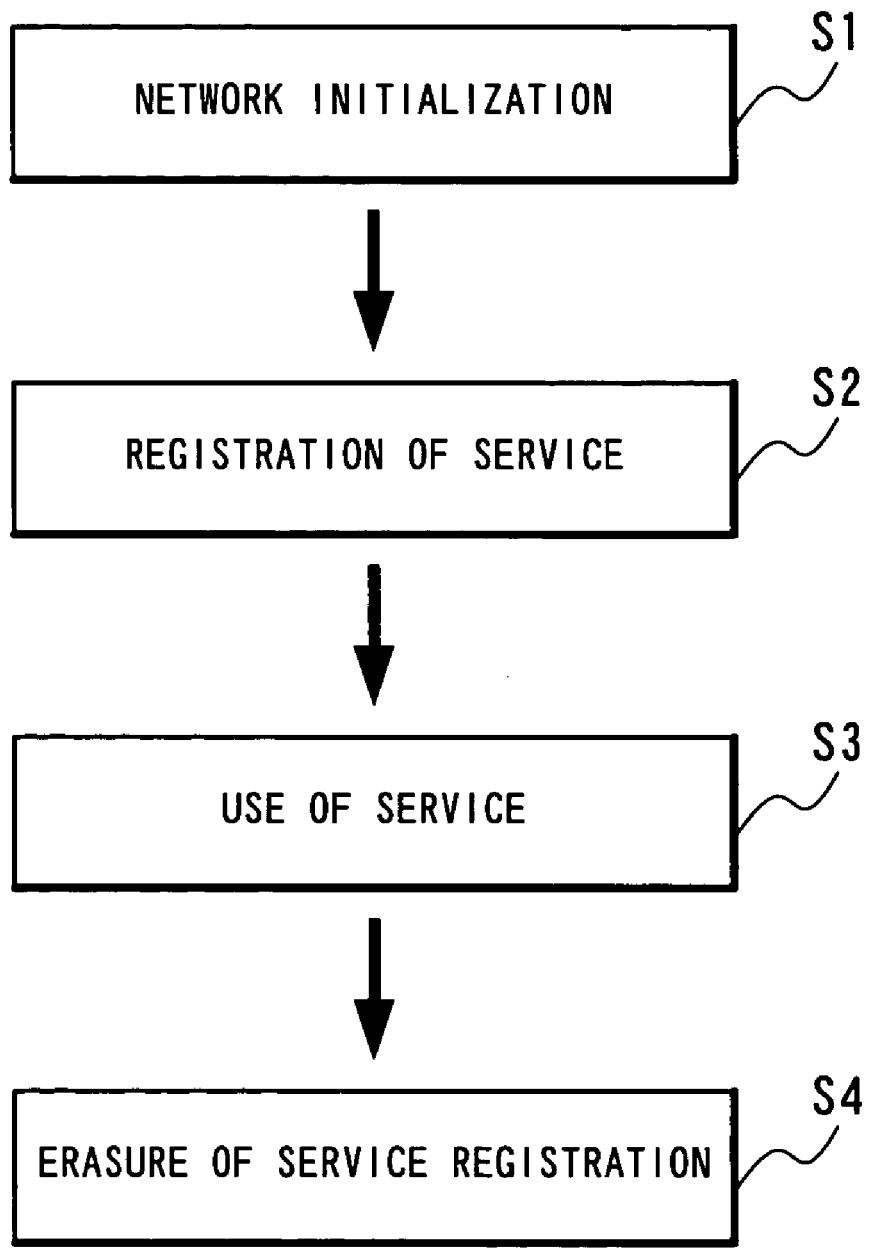

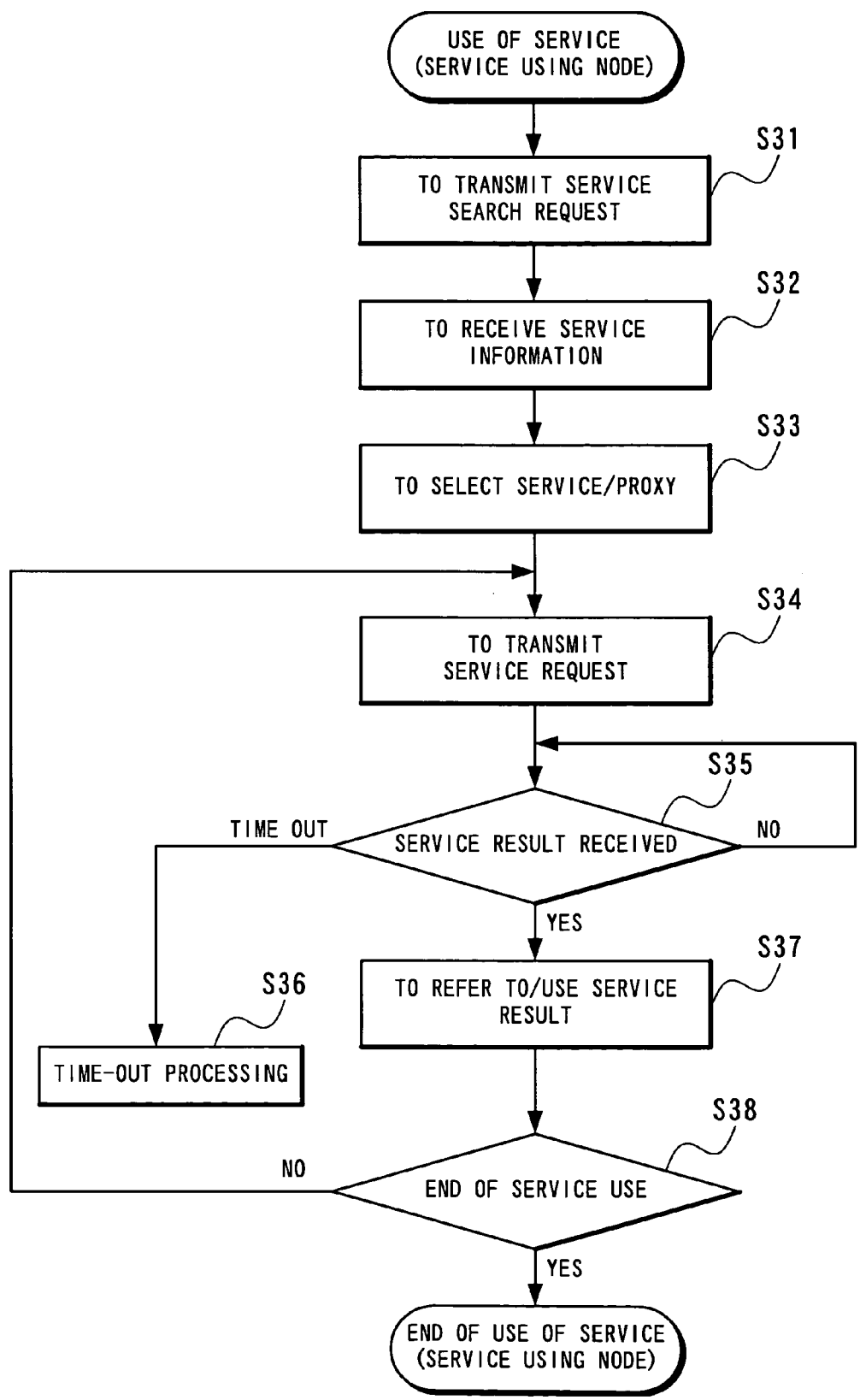

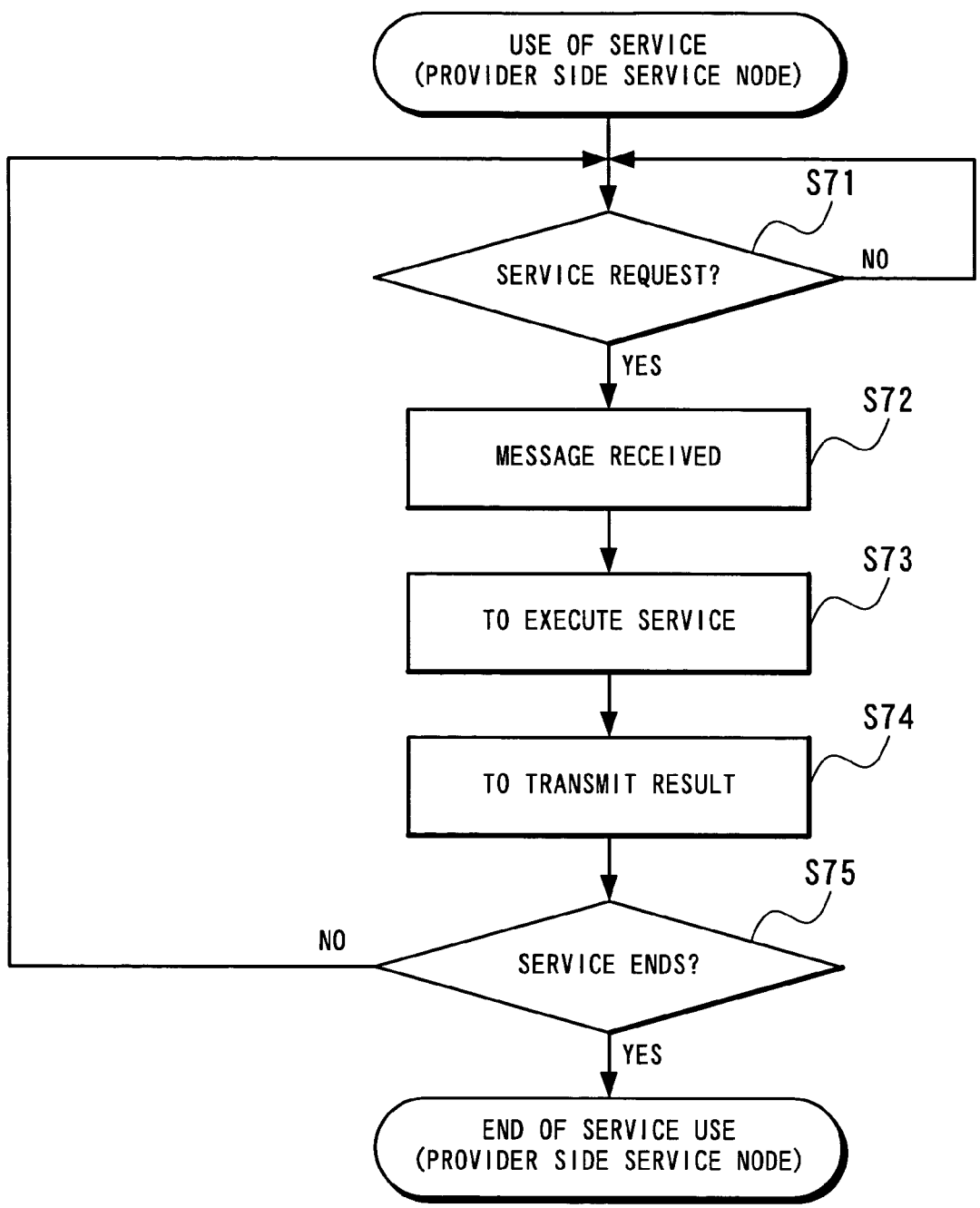

NETWORK CONTROL DEVICE AND CONTROL METHOD AND PROGRAM THEREOF

BACKGROUND OF THE INVENTION

1. Field of the Invention

The present invention relates to network control device and control method and a program thereof and, more particularly, to network control device and control method and a program thereof which enable efficient execution of linkage between distributed services while reducing physical constraints on the network.

2. Description of the Related Art

In recent years, as network communication systems including the Internet have been put to commercial use, it becomes a common practice for individuals to use the Internet not only at offices but also at home. We are now at the stage of embodying establishment of a system (ubiquitous computing) which enables numbers of conventionally isolated various kinds of apparatuses to use self-contained computer resources with each other through a network, thereby providing more facility as a whole.

As topology in networks including the Internet, bus topology and ring topology are well known. In bus topology, signals are transmitted in both ways on a bus, while in ring topology, they are transmitted in one way on a closed loop cable.

A sub-network node connected to the network transmits information onto a network line, as well as taking in information related to each equipment connected to the node in question from the information transmitted through the network line.

With reference to FIGS. 10 and 11 which show one example of a mode of connection between a sub-network and a network control device, with the above-described conventional network system, although a distributed service in which the entire system is divided into some of highly independent functional units to distribute and arrange each functional unit at an optimum machine had been used in a closed form within the same kind of sub-networks, sharing of information has been conducted with network connection provided between these sub-networks.

Moreover, as the next step, there arises the need of distributed services between different kinds of sub-networks as a higher degree of freedom.

In order to meet the need, as shown in FIGS. 10 and 11, it is a conventional practice to connect sub-networks which should be connected by a gate way that serves for the connection to another host via its connected host computer, as well as individually executing conversion of messages inherent to the relevant sub-networks to/from each other.

The example shown in FIG. 11 is recited, for example, in Japanese Patent Laying-Open (Kokai) No. Heisei 11-215174.

The system recited in the literature aims at using, from a certain network, a network of a system of a kind different from the network without being conscious of the system of the partner network.

As described above, since in the conventional network communication system, sub-networks which should be connected are connected by a gate way that serves for the connection to another host via its connected host computer, while conversion of messages inherent to the relevant sub-networks to/from each other is individually conducted, such a case where the number of different kinds of sub-networks to be connected therebetween is small could be coped with by the application of this method.

Because most of the conventional systems have such a simple sub-network structure, no more special measure has been required.

With an increase in the number of sub-networks and a following increase in the volume of service traffic which is information transmitted and received through a network, however, the volume of processing at a gate way portion has been increased. In addition, when a conventional method is applied, physical constraints such as network wiring have become heavier depending on a system to which the method is applied.

More specifically, problems in conventional art are as follow. First problem is that in a method where sequential conversion is conducted when services belonging to sub-networks having different kinds of network architectures link through a plurality of sub-networks, service directory management of managing message conversion and information and providing a user with the information and management of packet routing for selecting the best packet from a set of data sectioned to have a fixed size are complicated.

As a result, overhead during processing is increased to consume more resources, while a throughput of the network system is reduced.

The reason is that with no protocol indicative of a procedure for service management common among a plurality of sub-networks defined, an inherent service management protocol is already mounted. Another reason is that in terms of successiveness, there are many cases where mounting a completely new and common service management protocol gives no solution.

Second problem is that multi-stage message conversion increases a management overhead for guaranteeing its completeness and reversibility.

The reason, which is common to the first reason, is that since a sub-network as a target here is each mounted with its inherent service management protocol, setting of a protocol for executing general abstraction layer fails to function effectively.

SUMMARY OF THE INVENTION

An object of the present invention, which takes the above-described conventional shortcomings into consideration, is to provide network control device and control method and a program thereof which enable efficient execution of message, argument and response relay service in linkage between distributed services while reducing physical constraints on a gate way mechanism and its procedure at the time of the execution.

According to the first aspect of the invention, a network control device, wherein a network system is formed of sub-networks having different kinds of network architectures, and which comprises a relay service efficiency promoting section which reduces physical constraints on a gate way mechanism and on a procedure of the mechanism at the time of executes a service of relays a message, an argument and a response in the network for the linkage of objects operating on network nodes belonging to the sub-networks, the relay service efficiency promoting section having a service registry provided on the gate way to store information necessary for accessing a service on other sub-network.

According to another aspect of the invention, a network control device, wherein a network system is formed of sub-networks having different kinds of network architectures, and which comprises a relay service efficiency promoting section which reduces physical constraints on a gate way mechanism and on a procedure of the mechanism at the time of executes a service of relaying a message, an argument and a response in the network for the linkage of objects operating on network nodes belonging to the sub-networks, the relay service efficiency promoting section, in a case where relaying is conducted between the sub-networks connected in cascade, having a message transfer mechanism.

According to another aspect of the invention, a network control device, wherein a network system is formed of sub-networks having different kinds of network architectures, and which comprises a relay service efficiency promoting section which reduces physical constraints on a gate way mechanism and on a procedure of the mechanism at the time of executes a service of relaying a message, an argument and a response in the network for the linkage of objects operating on network nodes belonging to the sub-networks, the relay service efficiency promoting section having a virtual machine as a mechanism for executing a portable code independent of execution environments mounted on the gate way and having a function of loading and executing a protocol-dependent portion of a service proxy through the network.

According to another aspect of the invention, a network control device, comprising a sub-network node formed of an information system network, an operation system network, a wireless interconnect and a plurality of lines of portable apparatus interconnects, first, second and third sub-networks mounted with different kinds of protocols/profiles, a first gate way/proxy which connects the first and the third sub-networks and a second gate way/proxy which connects the second and the third sub-networks, wherein processing of a physical layer and a data link layer is mounted as protocols of the first, the second and the third sub-networks, and which further comprises a common transport layer, and a service proxy and a client proxy shared by the first and the third sub-networks.

According to another aspect of the invention, a network control method, wherein a network system is formed of sub-networks having different kinds of network architectures, and a relay service efficiency promoting section which reduces physical constraints on a gate way mechanism and on a procedure of the mechanism at the time of executes a service of relays a message, an argument and a response in the network for the linkage of objects operating on network nodes belonging to the sub-networks, and which comprises a network initialization step by the relay service efficiency promoting section, in a case where relaying is conducted between the sub-networks connected in cascade, of conducting setting or determination of a physical layer address, determination of a logical address in the sub-network, activation of a network management service and activation of an applied service as set forth in a network initialization procedure defined for each the sub-network by using a message transfer mechanism, a service registration step of registering a service to be brought to be public among services of the sub-networks to other sub-network, a service using step of using a registered service, and a service registration erasing step of erasing registration of the service after the use of the service.

According to another aspect of the invention, a network control method, wherein a network system is formed of sub-networks having different kinds of network architectures, and which comprises a relay service efficiency promoting section which reduces physical constraints on a gate way mechanism and on a procedure of the mechanism at the time of executes a service of relaying a message, an argument and a response in the network for the linkage of objects operating on network nodes belonging to the sub-networks, and wherein the relay service efficiency promoting section, in a case where relaying is conducted between the sub-networks connected in cascade, by a message forwarding function included in the message transfer mechanism, sends a converted message to a target sub-network at the time of service linkage between sub-networks not directly connected in terms of network topology to conduct a service between a service using node and a service providing node on the target sub-network without repeating message conversion.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings:

FIG. 2 is a structural diagram of a distributed service type network for a vehicle which is taken as one example of the first embodiment;

FIG. 3 is a flow chart showing outlines of the entire processing according to the first embodiment of the present invention;

FIG. 5A is a detailed flow chart of a node using a service out of service using processing S3 shown in FIG. 3;

FIG. 7 is a flow chart of a provider side service node out of the service using processing S3 shown in FIG. 3;

DESCRIPTION OF THE PREFERRED EMBODIMENT

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

First, for the facility of understanding of each embodiment of the present invention, outlines will be given of other terms than the above-described gate way and distributed service among terms for use in the following description of embodiments.

Interconnect, which generally represents a means for connecting different systems with each other, here denotes in particular a means for connection with each other which employs a connection method different from that of a network protocol used in a system noted.

Client represents a computer or software on the side which asks for a service. Nodes represent a junction point on a network, a relay point on the Internet and a computer disposed at the point.

Forwarding processing represents processing of once receiving data and transferring the same.

Proxy represents a server function disposed for ensuring security and/or realizing high-speed access at the time of Internet connection made from an internal network.

Protocol, which is a code for transmitting and receiving data on a network, represents a procedure for communication. Property denotes state information or control information accompanying a service element or a function element. Profile represents a class whose communication specification more heavily depends on a function provided by a node. Layer represents a physical layer. Registry represents a data base related to resources on a network.

Next, a first embodiment of the present invention will be described in detail with reference to the drawings.

Figure 1:
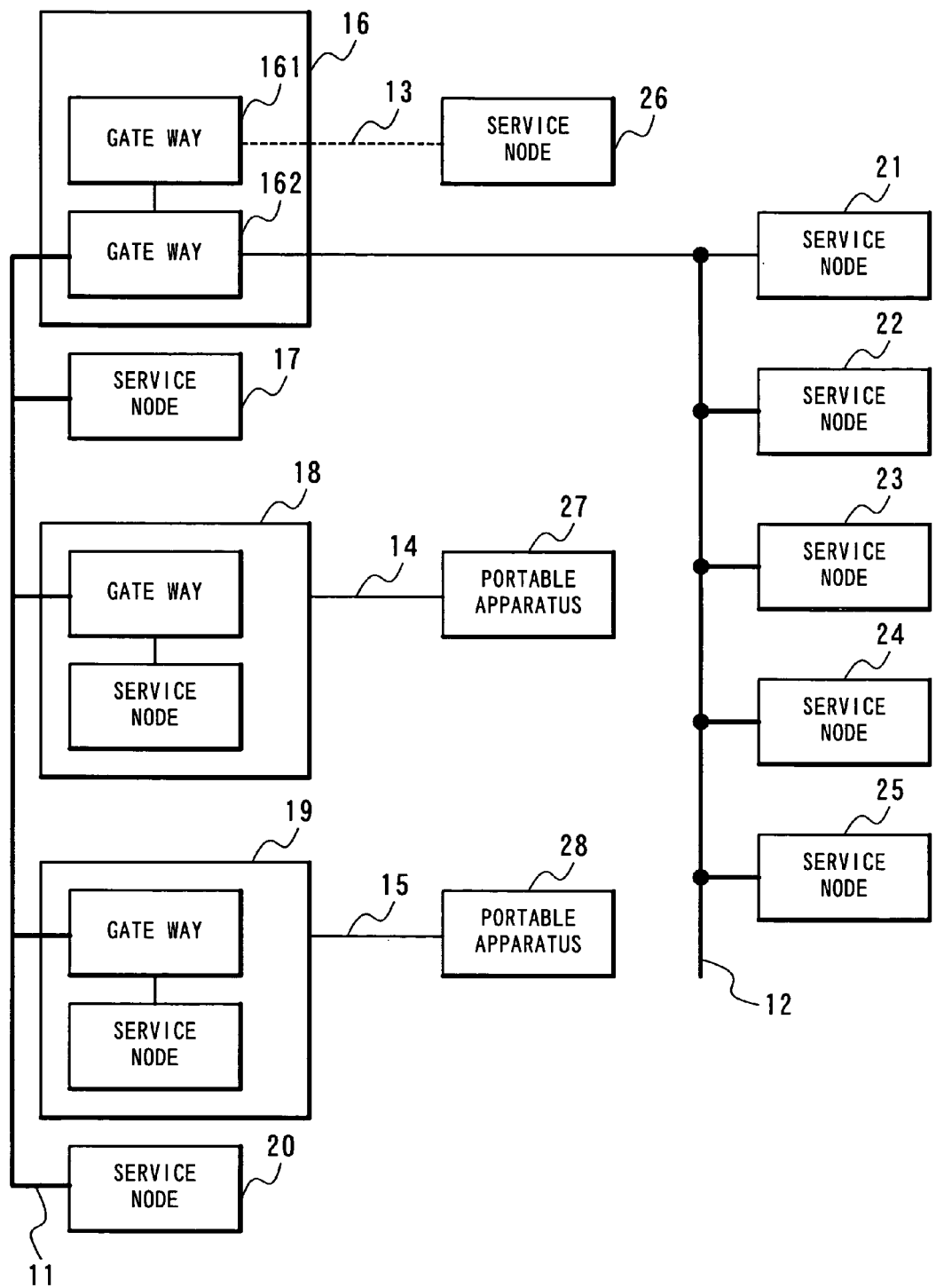
FIG. 1 is a structural diagram of a network according to a first embodiment of the present invention.

FIG. 1 is a structural diagram of a network in the first embodiment of the present invention and FIG. 2 is a structural diagram of a distributed service type network system for a vehicle which is taken as one example of the first embodiment of a network control device according to the present invention.

With reference to FIG. 1, the network control device of the present invention includes as a sub-network an information system network 11, an operation system network 12, a wireless interconnect 13, two lines of portable apparatus interconnects 14 and 15 and a gate way 16, with the information system network 11 connected to two service nodes 17 and 20, two service nodes 18 and 19 having a gate way function and first and second gate ways 161 and 162 connected with each other.

Connected to the operation system network 12 are the second gate way 162 and service nodes 21, 22, 23, 24 and 25, connected to the wireless interconnect 13 are the first gate way 161 and a service node 26 and connected to the portable apparatus interconnects 14 and 15 are portable apparatus 27 and 28, respectively.

With reference to FIG. 2, a distributed service type network system for a vehicle which is taken as one example of the first embodiment of the network control device according to the present invention includes sub-networks a 31, b 32 and c 33 mounted with different kinds of protocol/profiles, a gate way/proxy 34 for connecting the sub-network a 31 and the sub-network c 33, a gate way/proxy 35 for connecting the sub-network b 32 and the sub-network c 33, a sub-network node Nai 36 on the sub-network a 31, a sub-network node Nbi 37 and a sub-network node Nbj 38 on the sub-network b 32, and a sub-network node Nci 39 on the sub-network c 33.

The gate way/proxy 34 is mounted with processing of a physical layer a 40 and a data link layer a 41 as a protocol of the sub-network a 31, and a physical layer c 42 and a data link layer c 43 as a protocol of the sub-network c 33.

The gate way/proxy 34 is further mounted with a common transport/network layer 44, a service proxy a/c 45 of the sub-network a 31 and the sub-network c 33 and a client proxy a/c 46 of the sub-network a 31 and the sub-network c 33.

Service message conversion processing a 47, service message conversion processing c 48 and message forwarding processing 49 operable under the control of these proxies are mounted.

Also arranged is a service registry 50 for holding a property of a service existing on a network composed of a plurality of sub-networks.

On the other hand, the gate way/proxy 35 is mounted with processing of each of a physical layer b 51 and a data link layer b 52 as a protocol of the sub-network b 32 and a physical layer c 53 and a data link layer c 54 as a protocol of the sub-network c 33.

The gate way/proxy 35 is further mounted with a common transport/network layer 55, a service proxy c/b 56 of the sub-network b 32 and the sub-network c 33 and a client proxy c/b 57 of the sub-network b32 and the sub-network c 33.

Service message conversion processing b 58, service message conversion processing c 59 and message forwarding processing 60 operable under the control of these proxies are mounted.

Also arranged is a service registry 61 for holding a property of a service existing on a network composed of a plurality of sub-networks.

Operation of thus structured first embodiment will be described.

Figure 4A:
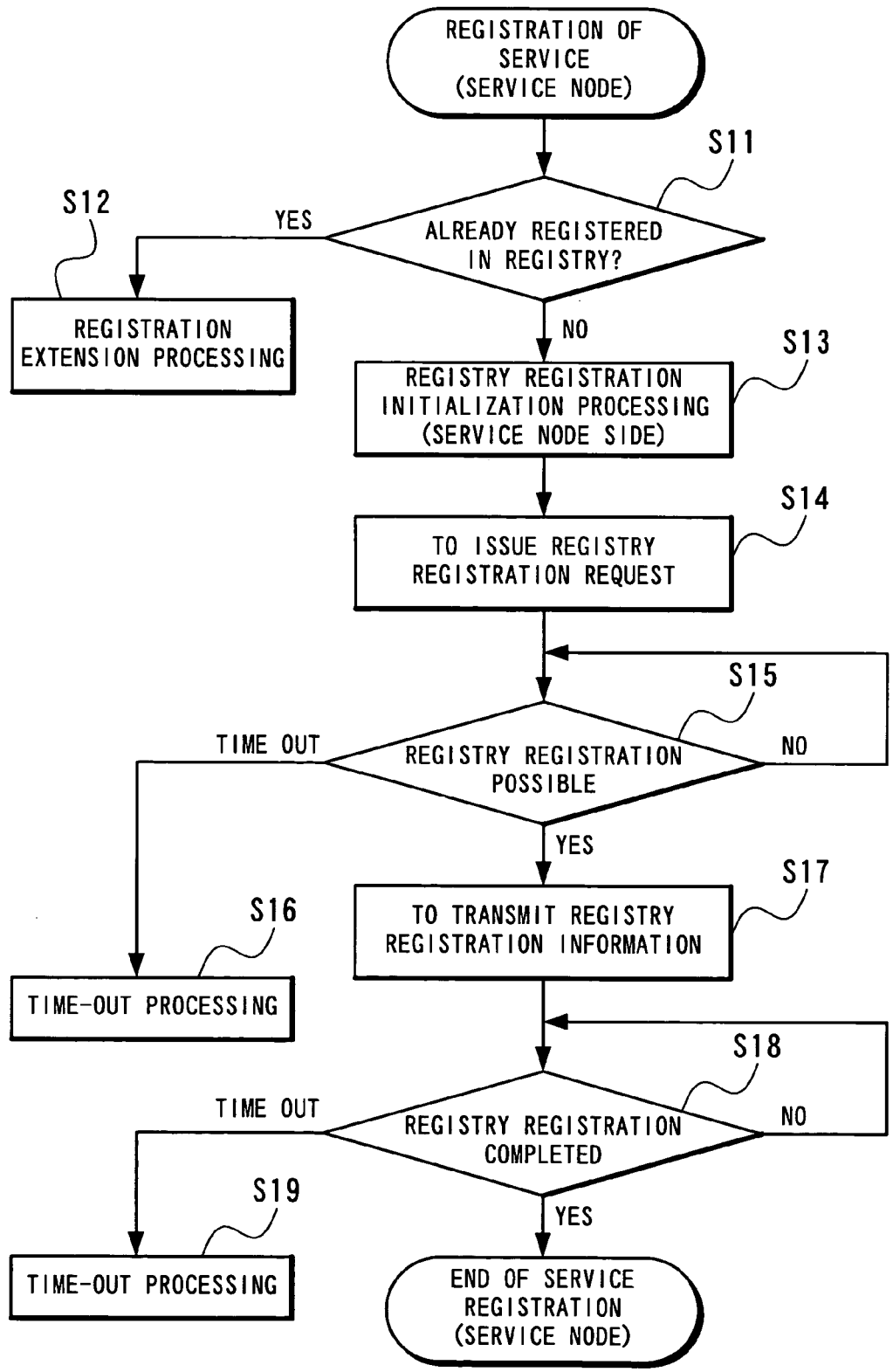
FIG. 4A is a detailed flow chart of service registration processing S2 shown in FIG. 3.
Figure 4B:
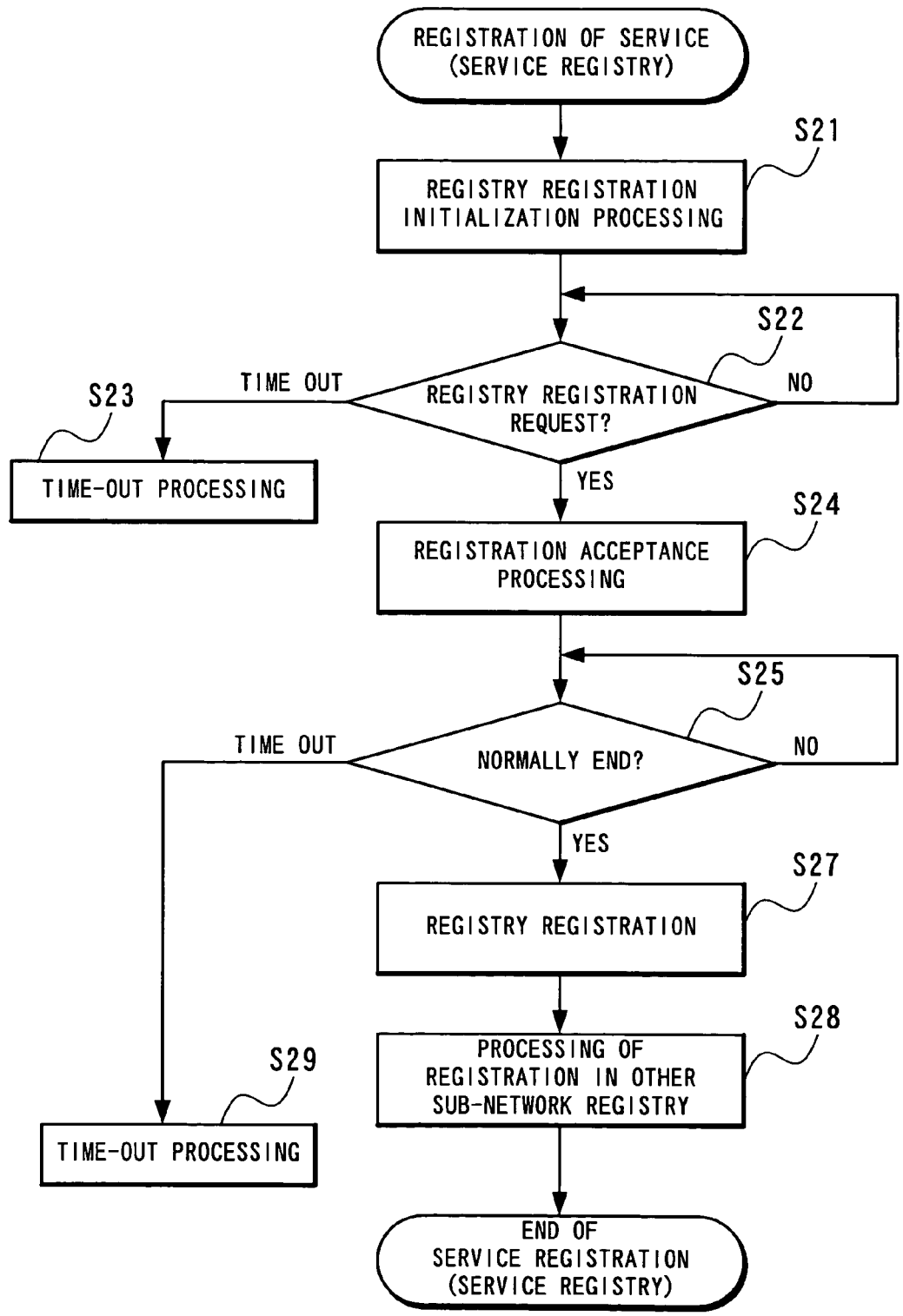
FIG. 4B is a detailed flow chart of the service registration processing S2 shown in FIG. 3.
Figure 5B:
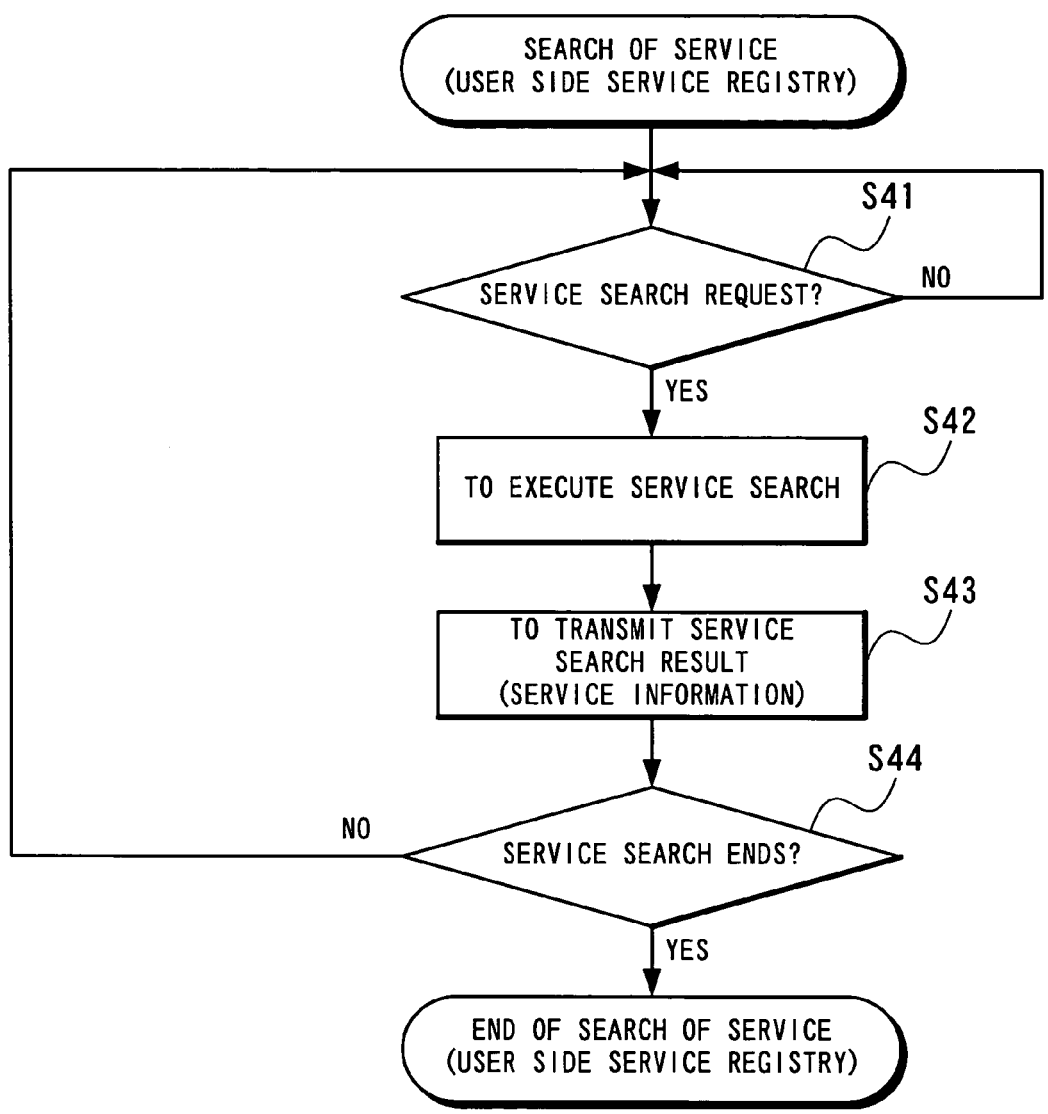
FIG. 5B is a detailed flow chart of search of a service in a user side service registry out of the service using processing S3 shown in FIG. 3.

FIG. 3 is a flow chart showing outlines of the entire processing, FIGS. 4A and 4B are detailed flow charts of service registration processing S2 shown in FIG. 3, and FIGS. 5A and 5B are detailed flow charts of a service using node and service search by a user side service registry out of service using processing S3 shown in FIG. 3.

Figure 6A:
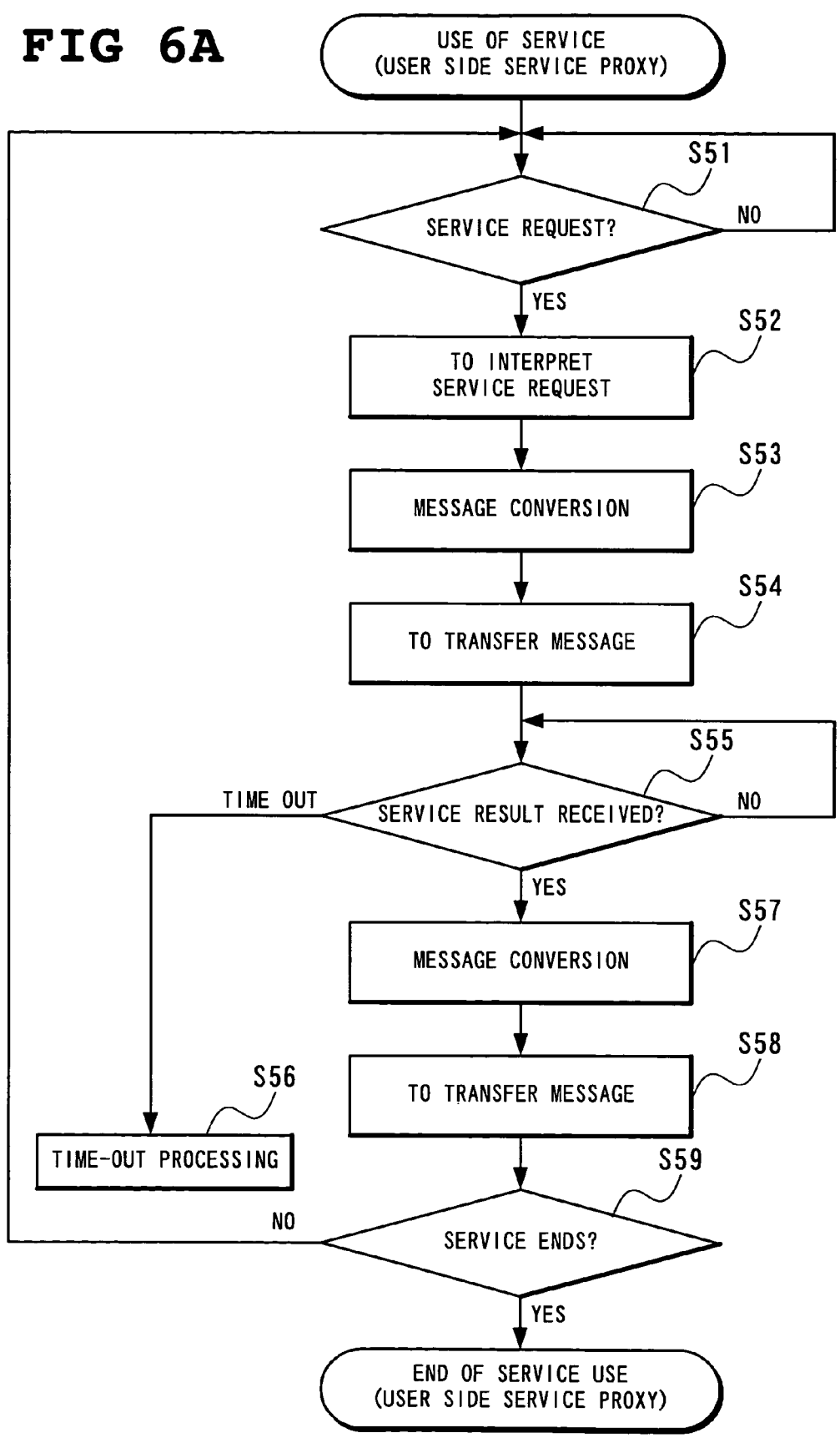
FIG. 6A is a detailed flow chart of a user side service proxy out of the service using processing S3 shown in FIG. 3.
Figure 6B:
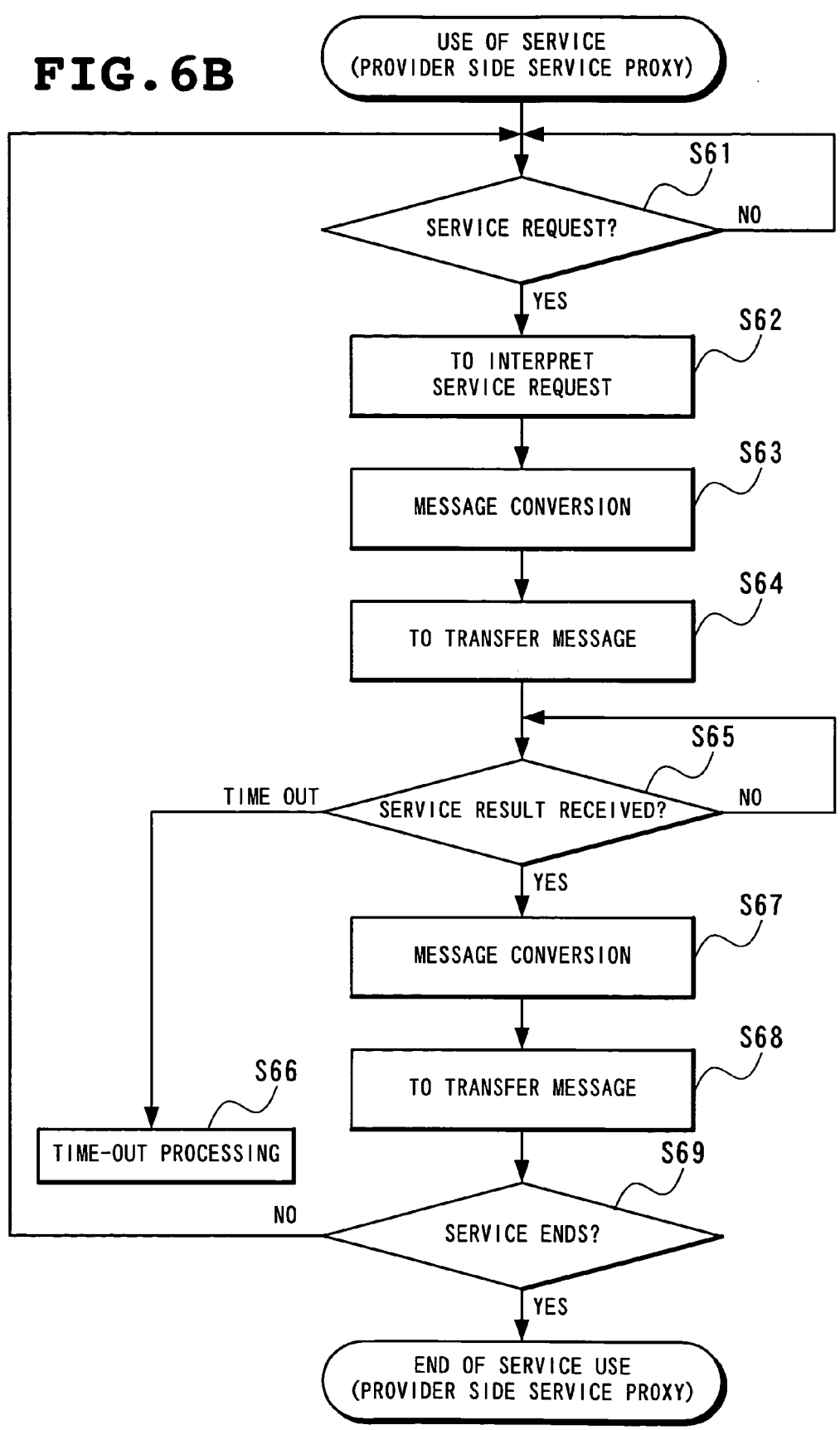
FIG. 6B is a detailed flow chart of a provider side service proxy out of the service using processing S3 shown in FIG. 3.

FIGS. 6A and 6B are detailed flow charts of a user side service proxy and a provider side service proxy out of the service using processing S3 shown in FIG. 3 and FIG. 7 is a flow chart of a provider side service node out of the service using processing S3 shown in FIG. 3.

With reference to FIG. 3, related to network initialization processing S1, a physical layer address is set or determined according to a network initialization procedure defined for each sub-network and a logical address in the sub-network is determined as well.

Further executed are activation of a network management service in the sub-network, activation of an applied service in the sub-network and the like.

Next, conduct service registration processing S2 with respect to a service to be brought to be public to other sub-networks out of services of individual sub-networks.

This processing includes a procedure on a service node in which a service to be registered is included, that is, a sub-network (a 31, b 32, c 33) node which provides the service and a procedure of the service registries 50 and 61 on the gate way/proxy (34, 35) nodes paired with the service node, which procedures are executed following the steps shown in FIGS. 4A and 4B.

Next, description will be made of an execution procedure of the present embodiment with reference to FIGS. 4A and 4B.

At Step S11 in FIG. 4A, a service node, the sub-network a31, for example, confirms that a service in question is already registered.

When registration of the service is yet to be completed at Step S11, conduct registry registration initialization processing on the service node side at Step S13. When the registration is completed, conduct registration extension processing at Step S12.

On the other hand, at Step S21 in FIG. 4B, the service registry (50) node of the gate way/proxy 34, for example, conducts registration initialization processing after the activation to wait for a registry registration request to come from the service node side. If no request is made even after a lapse of a standby time, conduct time-out processing at Step S23.

Next, at Step S14 in FIG. 4A, the service node side issues a registry registration request to the service registry (50) node, as well as waiting for the service registry (50) node to inform whether registry registration is possible or not at Step S15. After a lapse of the standby time, conduct time-out processing at Step S16.

On the other hand, at Step S24 in FIG. 4B, the service registry (50) node side, upon here receiving the service registration request transmitted from the service node side, conducts registration reception processing and notifies the service node side which is a requesting node that registration of the service is possible to wait at Step S25. After a lapse of the standby time, conduct the time-out processing at Step S26.

Next, the service node side having received the notification that registration is possible at Step S15 in FIG. 4A executes transmission of service registry registration information to the service registry (50) node at Step S17 to wait at Step S18 and after a lapse of the standby time, conducts the time-out processing at Step S19.

The service registry (50) node having received the transmitted service registry registration information registers the service in the service registry in the node at Step S27 of FIG. 4B, as well as issuing a notification of registry registration completion to the service node side.

Upon receiving the registration completion notification at Step S18 in FIG. 4A, the service node side repeats the same processing if there exists other service to be registered among the services belonging to the node and upon completion of the processing, registration will end.

Also in the service registry 50, when the registration of all the services in the sub-network which are to be brought to be public to other sub-networks is completed, if in the contents whose registration is completed, there exists information to be held in a service registry on other sub-network, the information is transmitted to the service registry on other sub-network and upon completion of the transmission, the registration processing ends.

The foregoing processing leads to registration in the service registry on the sub-network to which the service belongs and in the service registry 61 on other sub-network c 33 and sub-network b 32.

Next, description will be made of a flow chart related to the use of a service which is the third phase in FIG. 3 with reference to FIGS. 5A, 5B, 6A, 6B and 7.

First, correlation among these figures will be described. Processing of using a service is made up of the following five independent processing.

More specifically, the first processing is processing of using a service shown in FIG. 5A, the second processing is processing of a service registry on a service using side sub-network shown in FIG. 5B, the third processing is processing of a user side service proxy shown in FIG. 6A, the fourth processing is processing of a service provider side service proxy shown in FIG. 6B and the fifth processing is processing of a service provider side service node.

Next, operation of each of the above-described processing will be described in time series.

First, in FIGS. 5A and 5B, a node mounted with software for using a service (hereinafter referred to as a service using node), the sub-network node Nai 36, for example, searches the entire network for a service to be used.

This function is provided by, for example, the service registry 50 provided on the sub-network a 31 to which the service using node belongs. More specifically, the network node Nai 36 as a service using node transmits a service search request to the service registry 50 at Step S31 in FIG. 5A.

On the other hand, the service registry 50 waits for the service search request to come at Step S41 in FIG. 5B and upon receiving the service search request, searches for registry information in the node at Step S42 and returns service information relevant to a search key to the software of the network node Nai 36 which is the service using node having issued the service search request at Step S43.

After the return transmission, when the search is completed at Step S44, the service registry 50 again enters a state of waiting for a next search request.

Upon receiving a search result from the service registry 50 at Step S32 in FIG. 5A, the network node Nai 36 as the service using node selects a service optimum for a purpose among the received service information to determine the service proxy a 45 as a service and a proxy on the corresponding sub-network a 31 of its own.

The network node Nai 36 as the service using node issues a service request to the determined service proxy a 45 at Step 34. Transmission of information as a necessary argument is also included in this step.

Thereafter, wait for a service result to be returned at Step S35 and after a lapse of the standby time, conduct time-out processing at Step S36.

With reference to the transmitted service contents, the service proxy a 45 proceeds with the processing at Step S37.

At Step S38, repeat the same processing when requesting the same service again.

Next, processing to be executed at the back in order to realize the above-described processing will be described with reference to FIGS. 6A, 6B and 7.

First, operation of the service proxy a45 shown in FIG. 6A will be described. Since operation of the other service proxies c and b is also the same, no description will be made of each case.

Linking a service on the different sub-network a 31 and sub-network b 32 involves a service using side proxy and a service providing side proxy. Here, the provider side is assumed to be a service proxy b.

First, at Step S51, the service using side service proxy monitors whether a service request is made from the sub-network node Nai 36 in the sub-network a31 to which it belongs.

Upon receiving a service request from the sub-network node Nai 36, interpret the service request at Step S52 to subsequently conduct the predetermined message conversion a 47 at Step S53.

Next, at Step S54, transfer the contents converted into a message to the service proxy b 56 to which the sub-network node Nbi 37 that provides the service belongs. After the transfer, monitor arrival of a service execution result at Step S55.

On the other hand, in the service proxy processing on the service providing side shown in FIG. 6B, the service proxy b 56 on the service provider side operates in contrast to the above-described service proxy a 45 on the service requesting side.

More specifically, the service proxy b 56 on the service providing side monitors arrival of a service request at Step S61 and upon arrival of a service request from the service proxy a 45 of other sub-network, interprets the service request at Step S62, converts the request into a message system on its own sub-network at Step S63 and transfers the converted message to the sub-network node Nbi 37 on the service providing side at Step S64.

The service proxy on the service using side monitors arrival of a service execution result from the sub-network node Nbi 37 on the service provider side at Step S55 in FIG. 6A and upon the reception of the result, converts the result into a resultant message at Step S57.

Transmit the converted message toward the sub-network node Nai 36 as the service requesting node at Step S58 to wait for a next request and after a lapse of the standby time, execute the time-out processing at Step S56.

Next, operation of the service providing node which provides a service in practice will be described with reference to FIG. 7.

The sub-network node Nbi 37 as the provider side service node monitors arrival of a service request at Step S71. Upon arrival of the service request, interpret the request message at Step S72 to execute the service to be provided at Step S73.

Return the result to the service proxy b 56 on the transmission source's own sub-network at Step S74 to end the processing of one service request.

The foregoing processing enables software on a node requesting a service to have provision of a service executed in a node on other sub-network by a procedure equivalent, in form, to that of a service provided on its own sub-network.

As a supplement, description will be made of service linkage between sub-networks not directly connected with each other in terms of network topology in the following.

In such a case, a message converted will be delivered to a target sub-network by a function of the message forwards 49 and 60 in the gate way/proxies 34 and 35 shown in FIG. 2.

With this mechanism, service linkage between a service using node and a service providing node on a target sub-network can be realized without repeating message conversion.

First effect of the above-described first embodiment is to prevent drastic degradation in performance on a network formed of a plurality of sub-networks having different kinds of communication protocols/profiles while maintaining consistency with an existing protocol and successiveness to the same.

The reason is that linkage of a request for a service used in one sub-network with a service in a node on other kind of sub-network by a proxy and a message transfer mechanism is provided on a gate way.

Second effect is to avoid constraints on network topology while obtaining the above-described first effect.

The reason is that a mechanism is provided which delivers a service request message and a response message via a plurality of networks.

Third effect is to enable the amount of hardware which conducts network routing to be minimized while obtaining the above-described first and second effects.

The reason, similarly to that of the second effect, is that a mechanism is provided which delivers a service request message and a response message via a plurality of networks.

Fourth effect is to mitigate concentration of traffic on specific network control hardware.

The reason, similarly to that of the second effect, is that a mechanism is provided which delivers a service request message and a response message via a plurality of networks.

Next, a second embodiment of the present invention will be detailed with reference to the drawings.

Figure 8:
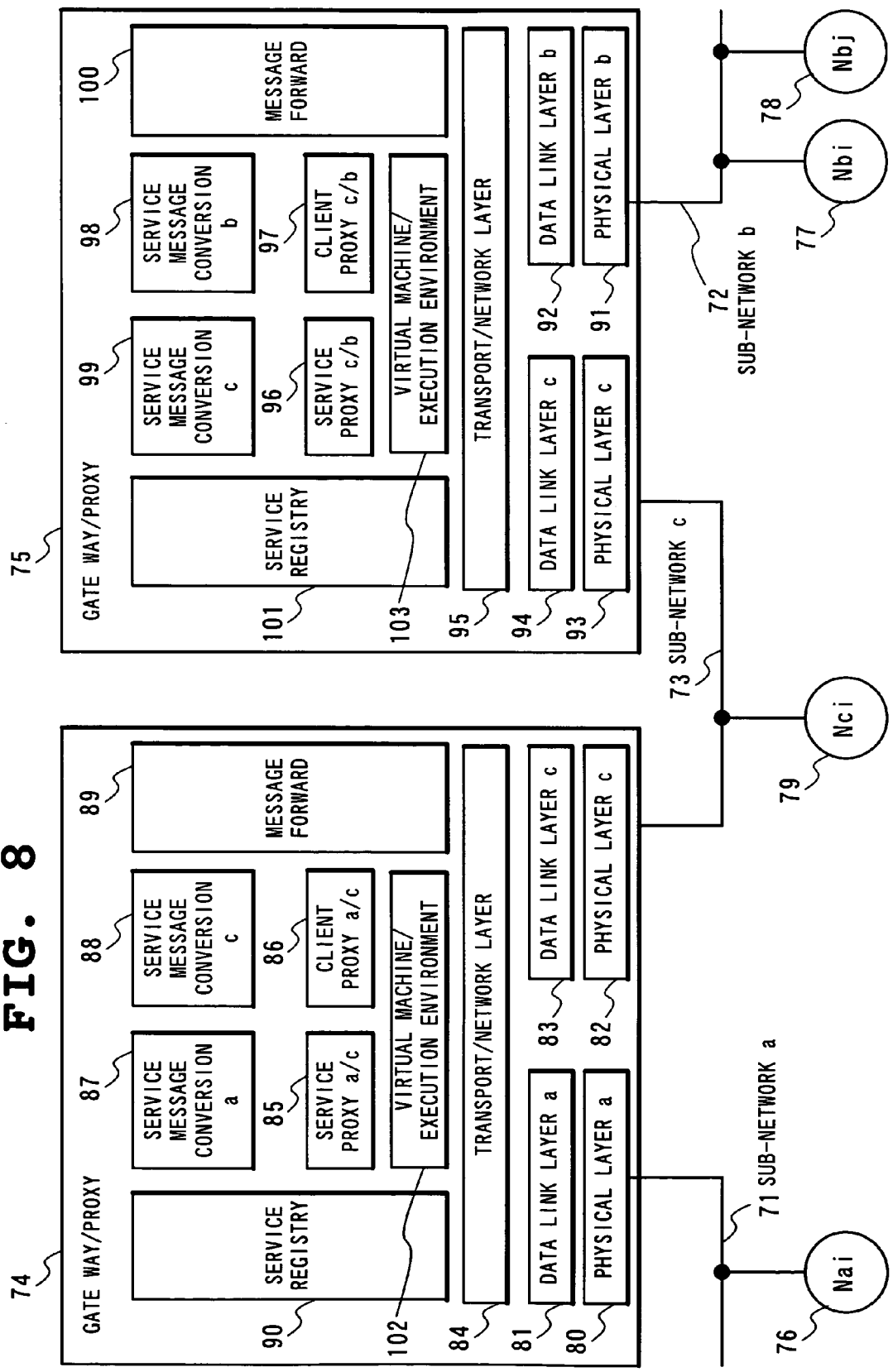
FIG. 8 is a structural diagram of a second embodiment.

Structure of the entire network is the same as that of FIG. 1. With reference to FIG. 8 showing a structural diagram of the second embodiment of a network control device according to the present invention which relates to a part of the network illustrated in FIG. 1, the device includes sub-networks a 71, b 72 and c 73 mounted with different kinds of protocols/profiles, a gate way/proxy 74 for connecting the sub-network a 71 and the sub-network c 73, a gate way/proxy 75 for connecting the sub-network b 72 and the sub-network c 73, a sub-network node Nai 76 on the sub-network a 71, a sub-network node Nbi 77 and a sub-network node Nbj 78 on the sub-network b 72, and a sub-network node Nci 79 on the sub-network c 72.

The gate way/proxy 74 is mounted with processing of a physical layer a 80 and a data link layer a 81 as a protocol of the sub-network a 71, and a physical layer c 82 and a data link layer c 83 as a protocol of the sub-network c 73 and is further provided with a common transport/network layer 84, a service proxy a/c 85 and a client proxy a/c 86 of the sub-network a 71 and the sub-network c 73.

Service message conversion processing a 87, service message conversion processing c 88 and message forwarding processing 89 operable under the control of these proxies are mounted. Part which executes processing depending on a service of the service proxy is described with portable codes independent of execution environments and a virtual machine/execution environment 102 is provided for executing the codes.

A service registry 90 for holding a property of a service existing on a network composed of a plurality of sub-networks is arranged on each gate way.

The gate way/proxy 75 for connecting the sub-network c 73 and the sub-network b 72 is mounted with processing of a physical layer b 91 and a data link layer b 92 as a protocol of the sub-network b 72 and a physical layer c 93 and a data link layer c 94 as a protocol of the sub-network c 73 and is further provided with a common transport/network layer 95, and a service proxy c/b 96 and a client proxy c/b 97 of the sub-network b 72 and the sub-network c 73.

Service message conversion processing b 98, service message conversion processing c 99 and message forwarding processing 100 operable under the control of these proxies are mounted. Part which executes processing depending on a service of the service proxy c/b 96 is described with portable codes independent of execution environments and a virtual machine/execution environment 103 is provided for executing these codes.

A service registry 101 for holding a property of a service existing on a network composed of a plurality of sub-networks is arranged on each gate way.

Next, with reference to FIG. 8 and the flow charts of the above-described FIGS. 5A, 5B, 6A, 6B and 7, operation of the second embodiment will be described.

First, the processing as a whole is formed of such phases as shown in the flow chart of FIG. 3.

Related to network initialization, a physical layer address is set or determined according to a network initialization procedure defined for each sub-network and a logical address in the sub-network is determined as well. Further executed are activation of a network management service in the sub-network, activation of an applied service in the sub-network and the like.

Next, conduct service registration processing with respect to a service to be brought to be public to other sub-networks out of services of individual sub-networks.

This processing includes a procedure on a service node in which a service to be registered is included and a procedure of a service registry on the gateway node paired with the service node, which procedures are executed by the steps which will be described in the following.

Next, description will be made of a procedure of the present embodiment with reference to FIGS. 9A and 9B in the following.

Figure 9A:
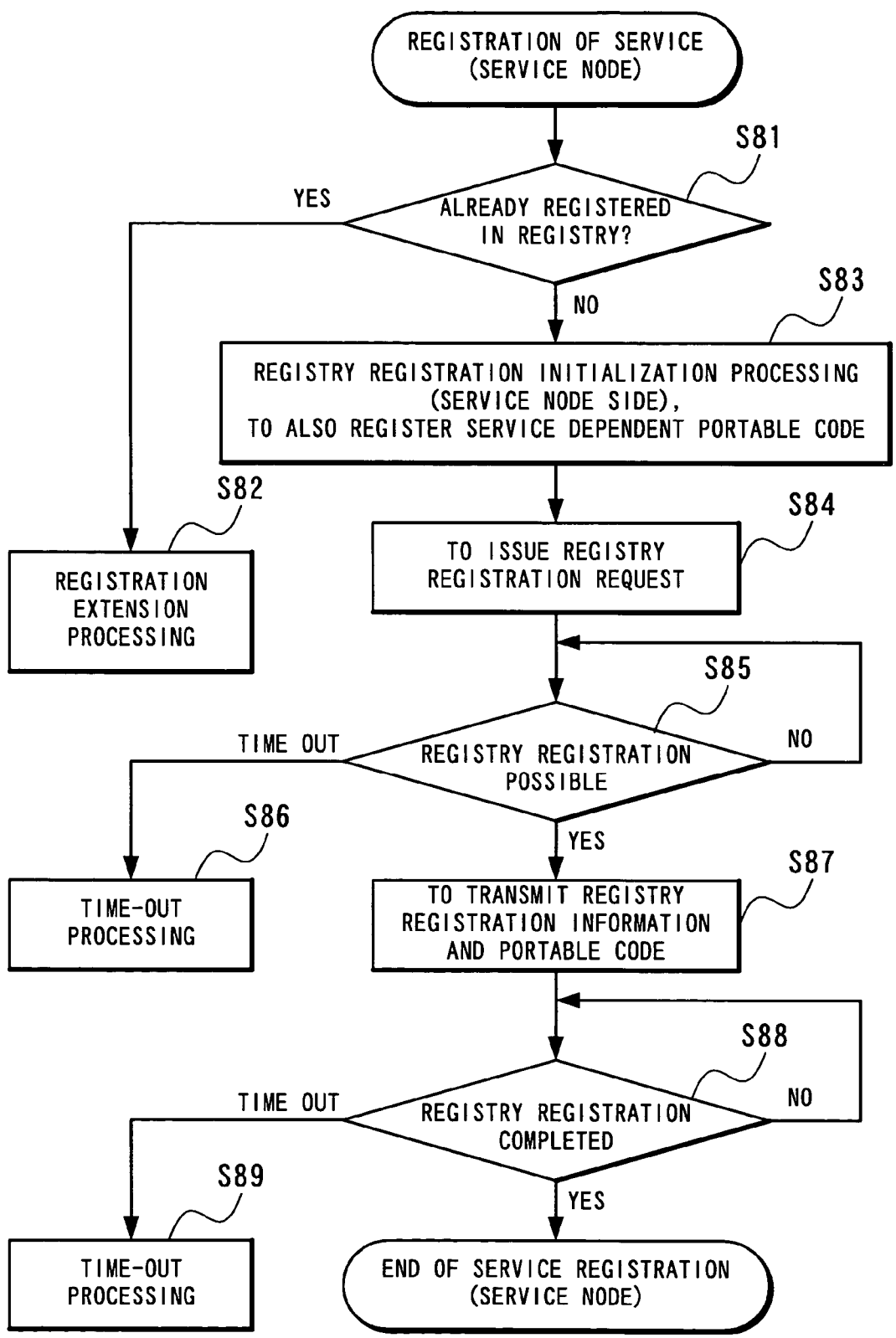
FIG. 9A is a detailed flow chart of service registration processing S2 in the second embodiment.

At Step S81 in FIG. 9A, the sub-network a 31, for example, confirms that a service in question is already registered.

When registration of the service is yet to be completed at Step S82, conduct registry registration initialization processing on the service node side at Step S83. When the registration is completed, conduct registration extension processing at Step S12.

Characteristic point of the second embodiment is that since service dependent processing of the service proxy c/b 96 and the client proxy c/b 97 is described with portable codes, these service dependent processing codes are registered at this stage in accordance with the registration of the service registry 101.

Figure 9B:
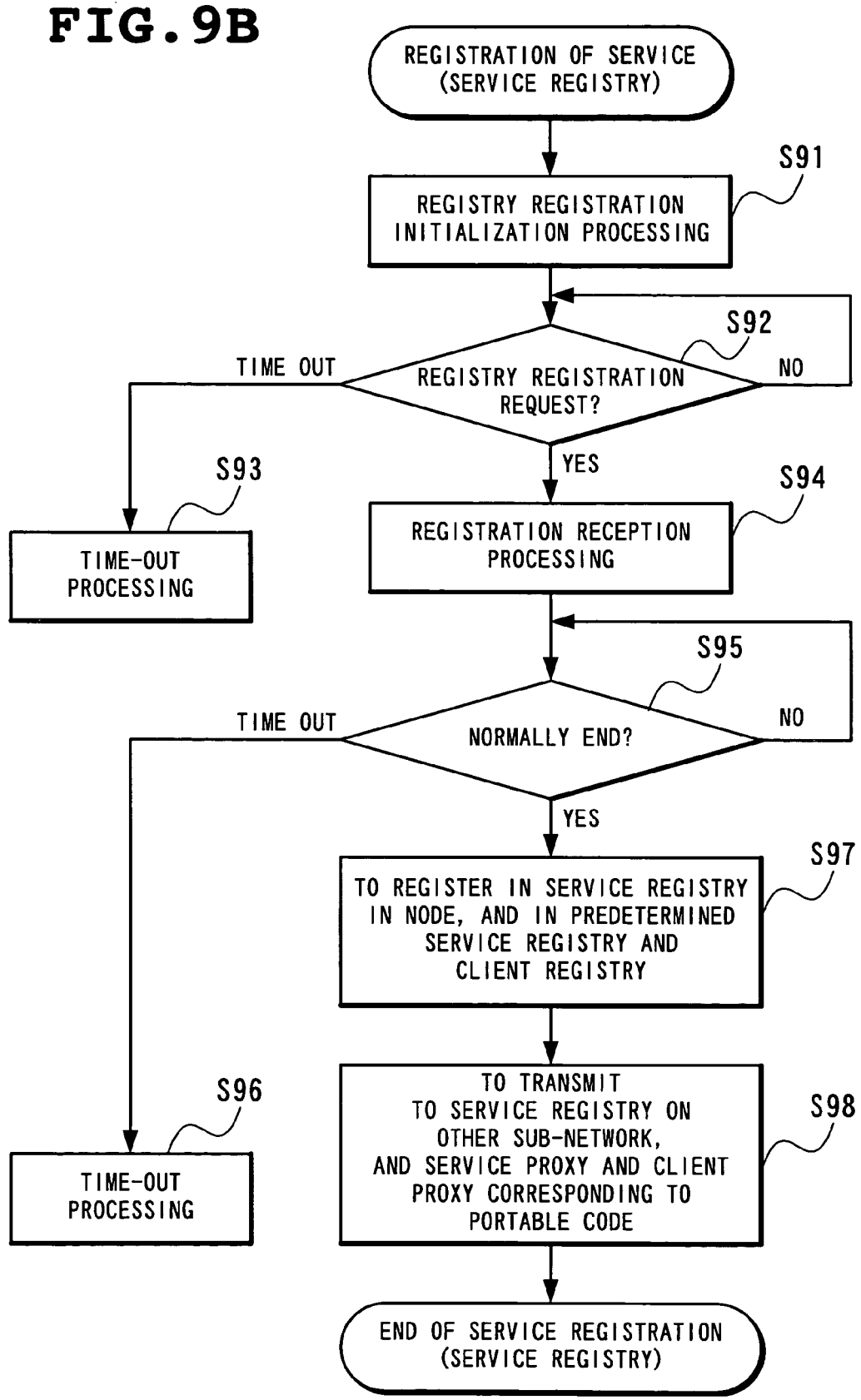
FIG. 9B is a detailed flow chart of the service registration processing S2 in the second embodiment.
Figure 10:
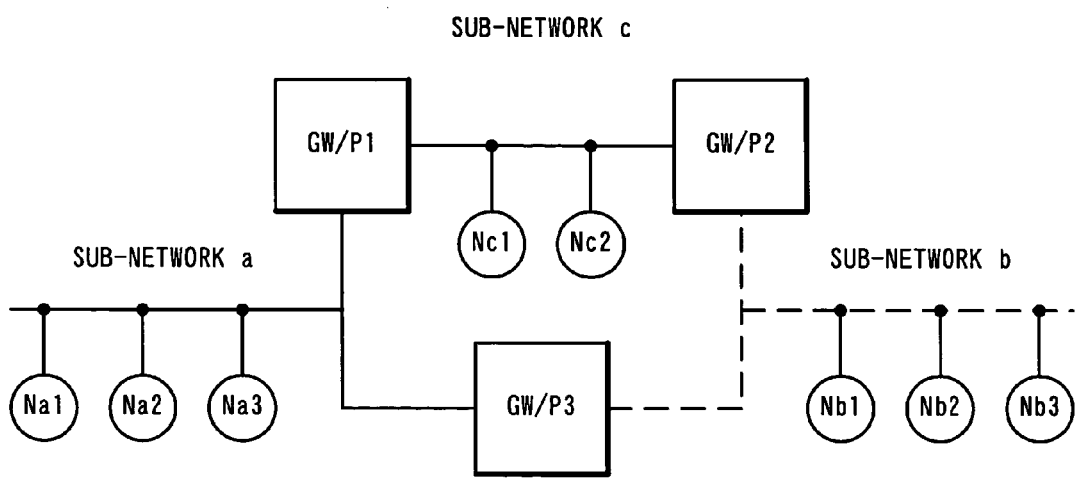
FIG. 10 is a diagram showing one example of a conventional form of connection between a sub-network and a network control device.
Figure 11:
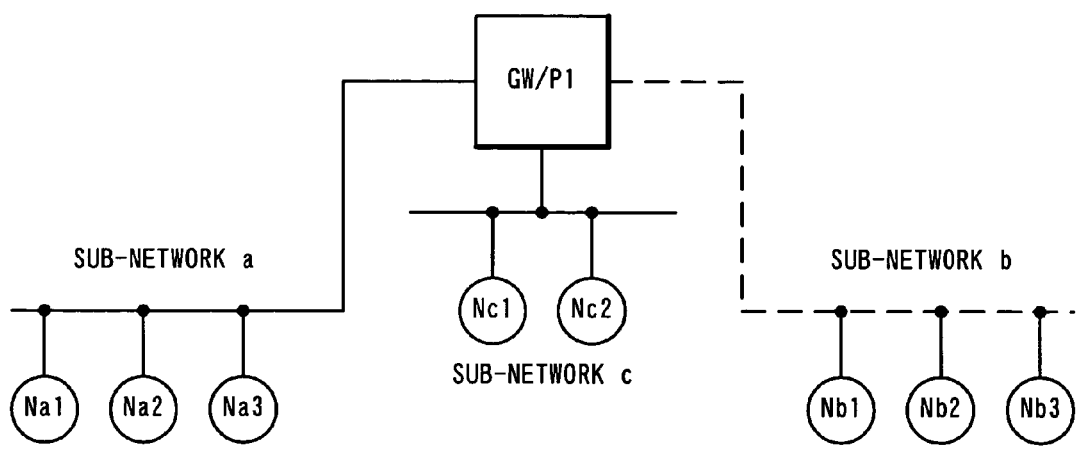
FIG. 11 is a diagram showing another example of a conventional form of connection between a sub-network and a network control device.

On the other hand, at Step S91 in FIG. 9B, the service registry (90) node of the gate way/proxy 74, for example, conducts registration initialization processing after the activation to wait for a registry registration request to come from the service node side. If no request is made even after a lapse of a standby time, conduct time-out processing at Step S93.

Next, at Step S84 in FIG. 9A, the service node side issues a registry registration request to the service registry (90) node, as well as waiting for the service registry (90) node to inform whether registry registration is possible or not at Step S85. After a lapse of the standby time, conduct the time-out processing at Step S86.

On the other hand, the service registry (90) node side, upon here receiving the service registration request transmitted from the service node side at Step S94 in FIG. 9B, conducts registration reception processing and notifies the service node side which is a requesting node that registration of the service is possible to wait at Step S95. After a lapse of the standby time, conduct the time-out processing at Step S96.

Next, the service node side having received the notification that registration is possible at Step S85 in FIG. 9A executes transmission of service registry registration information and portable codes of the service dependent processing of the service proxy c/b 56 and the client proxy c/b 57 to the service registry (90) node at Step S87 to wait at Step S88 and after a lapse of the standby time, conducts the time-out processing at Step S89.

The service registry (90) node having received the transmitted service registry registration information registers the information in the service registry in the node and in predetermined service registry and client registry at Step S87, as well as issuing a notification of registry registration completion to the service node side.

Upon receiving the registration completion notification at Step S88, the service node side repeats the same processing if there exists other service to be registered among the services belonging to the node and upon completion of the processing, registration will end.

Also in the service registry 90, when the registration of all the services in the sub-network which are to be brought to be public to other sub-networks is completed, if in the contents whose registration is completed, there exists information to be held in a service registry on other sub-network, the information is transmitted to the service registry on other sub-network, while the portable codes of the service proxy and the client proxy are transmitted to the corresponding service proxy and client proxy. Upon completion of the transmission, the registration processing ends.

The foregoing processing leads to registration in the service registry 90 on the sub-network to which the service belongs and in the service registry 101 on other sub-network c 73 and sub-network b 72.

The above-described portable codes of proxy are also registered in the service proxy and the client proxy on the sub-network to which the service belongs and in the service proxies and the client proxies of other sub-networks.

Next, description will be made of a flow chart related to the use of a service which is the third phase in FIG. 3 with reference to FIGS. 5A, 5B, 6A, 6B and 7.

First, correlation among these figures will be described. Processing of using a service is made up of five independent processing similarly to the above-described first embodiment, the processing of using a service illustrated in FIG. 5A, the processing of a service registry on a service using side sub-network illustrated in FIG. 5B, the processing of a user side service proxy illustrated in FIG. 6A, the processing of a service provider side service proxy illustrated in FIG. 6B and processing of a service provider side service node illustrated in FIG. 7.

Next, operation of each of the above-described processing will be described in time series.

First, in FIGS. 5A and 5B, a service using node mounted with software for using a service, the sub-network node Nai 76, for example, searches the entire network for a service to be used.

This function is provided by, for example, the service registry 90 provided on the sub-network a 71 to which the service using node belongs. More specifically, the sub-network node Nai 76 as a service using node transmits a service search request to the service registry 90 at Step S31 in FIG. 5A.

On the other hand, the service registry 90 waits for the service search request to come at Step S41 in FIG. 5B and upon receiving the service search request, searches for registry information in the node at Step S42 and returns service information relevant to a search key to the software of the sub-network node Nai 76 which is the service using node having issued the service search request at Step S43.

After the return transmission, when the search is completed at Step S44, the service registry 90 again enters a state of waiting for a next search request.

Upon receiving the search result from the service registry 90 at Step S32 in FIG. 5A, the sub-network node Nai 76 as the service using node selects a service optimum for a purpose among the received service information to determine the service proxy a 85 as a service and a proxy on the corresponding sub-network a 71 of its own at Step S33.

The sub-network node Nai 76 as the service using node issues a service request to the determined service proxy a 48 at Step S34. Transmission of information as a necessary argument is also included in this step.

Thereafter, wait for a service result to be returned at Step S35 and after a lapse of the standby time, conduct time-out processing at Step S36.

With reference to the transmitted service contents, the service proxy a 85 proceeds with the processing at Step S37.

At Step S38, repeat the same processing when requesting the same service again.

Next, processing to be executed at the back in order to realize the above-described processing will be described with reference to FIGS. 6A, 6B and 7.

First, operation of the service proxy a 85 shown in FIG. 6A will be described. Operation of the other service proxies c and b is also the same.

Linking a service on the different sub-network a 31 and sub-network b 32 involves a service using side proxy and a service providing side proxy. Here, the provider side is assumed to be a service proxy b 96.

First, at Step S51, the service using side service proxy a 85 monitors whether a service request is made from the sub-network node Nai 76 in the sub-network a 71 to which it belongs.

Upon receiving a service request made from the sub-network node Nai 76, interpret the service request at Step S52 to subsequently conduct the predetermined message conversion a 87 at Step S53.

Next, at Step S54, transfer the contents converted into a message to the service proxy b 96 to which the sub-network node Nbi 77 which provides the service belongs. After the transfer, monitor arrival of a service execution result at Step S55.

On the other hand, in the service proxy processing on the service providing side shown in FIG. 6B, the service proxy b 96 on the service providing side operates in contrast to the above-described service proxy a 85 on the service requesting side.

More specifically, the service proxy b 96 on the service providing side monitors arrival of a service request at Step S61 and upon arrival of a service request from the service proxy a 85 of other sub-network, interprets the service request at Step S62, converts the request into a message system on its own sub-network at Step S63 and transfers the converted message to the sub-network node Nbi 77 as the service providing side node at Step S64.

The service proxy on the service using side monitors arrival of a service execution result from the sub-network node Nbi 77 as the service providing side node at Step S55 in FIG. 6A and upon the reception of the result, converts the result into a resultant message at Step S57.

Transmit the converted message toward the sub-network node Nai 76 as the service requesting node at Step S58 to wait for a next request and after a lapse of the standby time, execute the time-out processing at Step S56.

Next, operation of the service providing node which provides a service in practice will be described with reference to FIG. 7.

The sub-network node Nbi 77 as the provider side service node monitors arrival of a service request at Step S71. Upon arrival of the service request, interpret the request message at Step S72 to execute the service to be provided at Step S73.

Return the result to the service proxy b 96 on the transmission source's own sub-network at Step S74 to end the processing of one service request.

The foregoing processing enables software on a node requesting a service to have provision of a service executed in a node on other sub-network by a procedure equivalent, in form, to that of a service provided on its own sub-network.

As a supplement, description will be made of service linkage between sub-networks not directly connected with each other in terms of network topology in the following.

In such a case, a message converted will be delivered to a target sub-network by a function of the message forwards 89 and 100 in the gate way/proxies 74 and 75 shown in FIG. 8.

With this mechanism, service linkage between a service using node and a service providing node on a target sub-network can be realized without repeating message conversion.

First effect of the above-described second embodiment is also to prevent drastic degradation in performance on a network formed of a plurality of sub-networks having different kinds of communication protocols/profiles while maintaining consistency with an existing protocol and successiveness to the same.

The reason is that linkage of a request for a service used in one sub-network with a service in a node on other kind of sub-network by a proxy and a message transfer mechanism is provided on a gate way.

Second effect is to avoid constraints on network topology while obtaining the above-described first effect.

The reason is that a mechanism is provided which delivers a service request message and a response message via a plurality of networks.

Third effect is to enable the amount of hardware which conducts network routing to be minimized while obtaining the above-described first and second effects.

The reason, similarly to that of the second effect, is that a mechanism is provided which delivers a service request message and a response message via a plurality of networks.

Fourth effect is to mitigate concentration of traffic on specific network control hardware.

The reason, similarly to that of the second effect, is that a mechanism is provided which delivers a service request message and a response message via a plurality of networks.

Fifth effect is that, even when software execution environments of a processor of a gate way/proxy, since an operating system or the like are different as long as execution environments of a common virtual machine and its codes are common, execution codes of a service dependent proxy can be loaded from the service node, so that service adaptability can be drastically improved, while network extensibility can be improved because later addition of a new service to an already operating network and modification of its interface are possible.

As described in the foregoing, since the network control device and control method and the program thereof according to the present invention enable a service request used in a certain sub-network to be linked with a service in a node on other kind of sub-network by a proxy and a message transfer mechanism provided on a gate way, drastic degradation in performance can be prevented while maintaining consistency with an existing protocol and successiveness to the same on a network formed of a plurality of sub-networks of different kinds of communication protocols/profiles.

In addition, constraints on network topology can be avoided while obtaining the above-described effect because a mechanism is provided which delivers a service request message and a response message via a plurality of networks.

Further effect is to enable the amount of hardware which conducts network routing to be minimized while obtaining the above-described two effects.

Moreover, traffic concentration on specific network control hardware can be mitigated.

Furthermore, according to the second embodiment, even when software execution environments of a processor of a gate way/proxy, an operating system or the like are different, as long as execution environments of a common virtual machine and its codes are common, an execution code of a service dependent proxy can be loaded from the service node, so that service adaptability can be drastically improved, and network extensibility can be improved because later addition of a new service to an already operating network and modification of its interface are possible.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

The invention claimed is:

1. A network control device for a network system including a plurality of sub-networks having different kinds of network architectures and a plurality of network nodes, the network control device comprising:

a relay service efficiency promoting section which reduces physical and procedural constraints on a gateway mechanism at the time when the gateway mechanism executes a service of relaying at least one of a message, a dialog and a response directed to link objects operating on network nodes belonging to said sub-networks in the network system, each said relay service efficiency promoting section having a service registry provided on said gateway to store information necessary for accessing a service on another sub-network, wherein said service registry shares said information autonomously with another service registry in another network control device belonging to another sub-network by transmitting said information to each other wherein said plurality of sub-networks comprise an information system network, an operation system network, a wireless interconnect and a plurality of lines of portable apparatus interconnects, wherein a plurality of service nodes having a gateway function and a first and a second gateways connected with each other are connected to said information system network, wherein said second gateway and a plurality of service nodes are connected to said operation system network, wherein said first gateway and an additional service node, other than said service nodes, are connected to said wireless interconnect, and wherein a plurality of portable apparatuses are connected to the plurality of lines of portable apparatus interconnects.

2. The network control device as set forth in claim 1, wherein said relay service efficiency promoting section has a service proxy provided on said gateway, said service proxy having a mechanism of relaying and standing proxy for processing to be executed at the time of requesting processing from a service on another sub-network.

3. The network control device as set forth in claim 1, wherein said relay service efficiency promoting section is operable to analyze a service request and conducting message conversion on said gateway.

4. A network control device for a network system including a plurality of sub-networks having different kinds of network architectures and a plurality of network nodes, the network control device comprising:

a relay service efficiency promoting section which reduces physical and procedural constraints on a gateway mechanism at the time when the gateway mechanism executes a service of relaying at least one of a message, a dialog and a response directed to link objects operating on network nodes belonging to said sub-networks in the network system, wherein, when said relaying is conducted between sub-networks connected in cascade, said relay service efficiency promoting section includes a message transfer mechanism, and wherein said plurality of sub-networks comprise an information system network, an operation system network, a wireless interconnect and a plurality of lines of portable apparatus interconnects, a plurality of service nodes having a gateway function and a first and a second gateways connected with each other being connected to said information system network, said second gateway and said plurality of service nodes being connected to said operation system network, said first gateway and an additional service node being connected to said wireless interconnect, and a plurality of portable apparatuses being connected to the plurality of lines of portable apparatus interconnects.

5. A network control device for a network system including a plurality of sub-networks having different kinds of network architectures and a plurality of network nodes, the network control device comprising:

a relay service efficiency promoting section which reduces physical and procedural constraints on a gateway mechanism at the time when the gateway mechanism executes a service of relaying at least one of a message, a dialog and a response directed to link objects operating on network nodes belonging to said sub-networks in the network system, said relay service efficiency promoting section having a virtual machine as a mechanism for executing a portable code independent of execution environments mounted on said gateway, said virtual machine being operable to load and execute a protocol-dependent portion of a service proxy through the network system, wherein said plurality of sub-networks comprise an information system network, an operation system network, a wireless interconnect and a plurality of lines of portable apparatus interconnects, a plurality of service nodes having a gateway function and a first and a second gateways connected with each other being connected to said information system network, said second gateway and said plurality of service nodes being connected to said operation system network, said first gateway and an additional service node being connected to said wireless interconnect, and a plurality of portable apparatuses being connected to the plurality of lines of portable apparatus interconnects.

6. A network control device, comprising:

a sub-network node including
an information system network,
an operation system network,
a wireless interconnect,
a plurality of lines of portable apparatus interconnects,
first, second and third sub-networks mounted with different kinds of protocols/profiles, processing of a physical layer and a data link layer being protocols of the first, second and third sub-networks, and
a first gateway/proxy which connects said first and said third sub-networks and a second gateway/proxy which connects said second and said third sub-networks;
a common transport layer; and
a service proxy and a client proxy both being shared by said first and said third sub-networks.

7. The network control device as set forth in claim 6, wherein first and second service message conversion processing and message forwarding processing are performed in response to connection between said first, said second and said third sub-networks under the control of said service proxy and said client proxy.

8. The network control device as set forth in claim 6, wherein a property holding service registry for a service existing on a network formed by said first, said second and said third sub-networks is arranged on each of said first and said second gateways.

9. The network control device as set forth in claim 6, wherein said first and said second gateway/proxies have portions for executing processing dependent on a service of said service proxy described with a portable code independent of execution environments, and wherein said first and said second gateway/proxies include a virtual machine/execution environment for executing said service-dependent processing.

10. A network control method for a network system including a plurality of sub-networks having different kinds of network architectures and a relay service efficiency promoting section which reduces physical and procedural constraints on a gateway mechanism at the time when the gateway mechanism executes a service of relaying at least one of a message, a dialog and a response directed to link objects operating on network nodes belonging to said sub-networks, the method comprising:
   initializing the network system using said relay service efficiency promoting section, in a case where relaying is conducted between said sub-networks connected in cascade said step of initializing including determination of a physical layer address, determination of a logical address in said sub-networks, activation of a network management service and activation of an applied service using a message transfer mechanism;
   registering a service to be brought public among services of said sub-networks to another sub-network;
   utilizing the registered service; and
   erasing registration of said registered service after the utilization of said service.

11. The network control method as set forth in claim 10, wherein said service registration step includes processing a procedure on a service node in which a service to be registered is included and processing a procedure of a service registry on a gateway node paired with the service node.

12. The network control method as set forth in claim 11, wherein said processing a procedure on the service node includes:
   a step of confirming whether the service is already registered in a service registry node,
   a registry registration initialization step conducted with respect to said service node when the registration is yet to be completed,
   a step of transmitting a service registry registration request to said service registry node, and
   a step of, upon receiving a registration request acceptance notification from said service registry node, transmitting registry registration information to said service registry node.

13. The network control method as set forth in claim 11, wherein said processing the procedure of the service registry includes:
   a registry registration initialization step to be conducted by said service registry node after activation,
   a step of waiting for a registry registration request from said service node,
   a step of receiving a service registration request transmitted from said service node side to accept the registration request,
   a step of notifying said service node as a requesting source that registration of the service is permitted to execute registry registration of receiving registry registration information from said service node side and issuing a registration completion notification to said service node side, and
   a step of, upon completion of registration of all the services to be brought to be public to another sub-network, transmitting information to be held in a service registry on the other sub-network to the service registry to end the processing.

14. The network control method as set forth in claim 11, wherein said step of utilizing the registered service includes a service using step of a service using node, a service search step in a service registry on a service using side sub-network, a service using step of a user side service proxy, a service using step of a service providing side service proxy and a service using step of a service providing side service node.

15. The network control method as set forth in claim 14, wherein said service using processing of a service using node includes the steps of:
   transmitting a service search request to a service registry for the search of a service to be used with the entire network as a target,
   selecting an optimal service based on a search result received from said service registry to determine a service and a proxy on a desired sub-network,
   issuing a service request to the determined service proxy from the service using node to wait for return of a result of the service and, upon return of a result of said service from said service proxy, proceeding with the processing, and
   repeating the same processing when requesting the same service again and ending the processing when the service is not used.

16. The network control method as set forth in claim 15, wherein said processing of waiting for a service result to be returned includes issuance of a service request to said determined service proxy from the service using node and issuance of information corresponding to a necessary request.

17. The network control method as set forth in claim 14, wherein said service search processing in said service registry includes the steps of:
   receiving said service search request from said service using node by said service registry on the user side to search for registry information in the owned node,
   returning service information relevant to a search key obtained as a result of the search to software of said service using node, and
   completing the search by said service registry and waiting for a next search request.

18. The network control method as set forth in claim 14, wherein said service using processing includes:
   a service using step at the user side service proxy linking services on different sub-networks, and
   a service using step at the provider side service proxy.

19. The network control method as set forth in claim 14, wherein until the end of the service, said service using processing at said user side service proxy further comprises:
   a step of monitoring a service request made from a node in a sub-network belonging to said service using side proxy,
   a step by said user side service proxy of, upon receiving a service request, interpreting the service request and after conducting predetermined message conversion, transferring the message to a provider side service proxy to which a node providing the service belongs and monitoring arrival of a service execution result after the transfer, and a step of, upon receiving said service execution result from said provider side service proxy, conducting message conversion to transmit the message to a service proxy designated by the service requesting side node.

20. The network control method as set forth in claim 14, wherein until the end of the service, said service using processing at said provider side service proxy further comprises the steps of:
- monitoring a service request made from said user side service proxy,
- upon receiving said service request, interpreting the service request,
- converting the request into a message system on the owned sub-network and transferring the message to a provider side node,
- thereafter monitoring arrival of a service execution result from said provider side node, and
- upon receiving said service execution result, converting the result into a message to transmit the message toward a service proxy designated by said service requesting node.

21. The network control method as set forth in claim 14, wherein the service using processing of the service provider side service node includes the steps of:
- monitoring arrival of a service request,
- upon arrival of said service request, interpreting a request message to execute a service to be provided, and
- returning an execution result to a service proxy on a transmission source's own sub-network to end the steps of one service request.

22. The network control method as set forth in claim 11, wherein said relay service efficiency promoting section further includes a virtual machine as a mechanism for executing a predetermined portable code mounted on the gateway, when a function of loading and executing a protocol-dependent portion of a service proxy on said gateway through the network is provided, said processing of a procedure on the service node comprising:
- a step of confirming whether the service is already registered in a service registry node,
- an initialization step of registration in a registry and registration of service-dependent processing codes of said service proxy and client proxy to be conducted with respect to said service node when the registration is yet to be completed,
- a step of transmitting a service registry registration request to said service registry node, and
- a step of, upon receiving a registration request acceptance notification from said service registry node, transmitting registry registration information and the portable codes of the service-dependent processing of the service proxy and the client proxy to said service registry node and when other service exists which is to be registered among services belonging to the node, repeating the same step to end the registration when the step is completed.

23. The network control method as set forth in claim 11, wherein the processing the procedure of the service registry includes:
- a registry registration initialization step to be conducted by the service registry on the gateway node after activation,
- a step of waiting for a registry registration request from said service node,
- a step of receiving a service registration request transmitted from said service node side to accept the registration request,
- a step of notifying said service node as a requesting source that registration of the service is permitted to execute each service registry and client registry registration of receiving registry registration information and a portable code of service-dependent processing of a service proxy and a client proxy from said service node side and issuing a registration completion notification to said service node side, and
- a step of, upon completion of registration of all the services to be brought to be public to other sub-network among said sub-networks, transmitting information to be held in a service registry on other sub-network to the service registry in question and transmitting the portable codes of said service proxy and client proxy to the corresponding said service proxy and said client proxy to end the processing.

24. A network control method for a network system including sub-networks having different kinds of network architectures and a relay service efficiency promoting section which reduces physical and procedural constraints on a gateway mechanism at the time when the gateway mechanism executes a service of relaying at least one of a message, a dialog and a response directed to link objects operating on network nodes belonging to said sub-networks in the network system, the method comprising:
- sending a converted message to a target sub-network using said relay service efficiency promoting section, in a case where relaying is conducted between said sub-networks connected in cascade, by a message forwarding function included in a message transfer mechanism of the relay service efficiency promoting section, wherein said sending of the converted message is accomplished at the time of service linkage between sub-networks not directly connected by a network topology to conduct a service between a service using node and a service providing node on the target sub-network without repeating message conversion.

25. A program recorded on a computer-readable medium and executable on a general purpose computer, the program causing the computer to execute procedure processing on a service node and comprising:
- a function of confirming that a service in question is already registered in a registry,
- a registry registration initialization function to be conducted with respect to a service node when the registration is yet to be completed,
- a function of transmitting a service registry registration request to a service registry node, and
- a function of, upon receiving a registration request acceptance notification from said service registry node, transmitting registry registration information to said service registry node and when other service exists which is to be registered among services belonging to the node, repeating the same processing to end the registration when the processing is completed.

26. A program recorded on a computer-readable medium and executable on a general purpose computer, the program causing the computer to execute procedure processing of a service registry and comprising:
- a registry registration initialization function to be conducted by a service registry node after activation,
- a function of waiting for a registry registration request from a service node,
- a function of receiving a service registration request transmitted from said service node side to accept the registration request, a function of notifying said service node as a requesting source that registration of the service is possible to execute registry registration of receiving registry registration information from said service node side and issuing a registration completion notification to said service node side, and a function of, upon completion of registration of all the services to be brought to be public to other sub-network among said sub-networks, transmitting information, out of the contents, to be held in a service registry on other sub-network to the service registry in question to end the processing.

27. A program recorded on a computer-readable medium and executable on a general purpose computer, the program causing the computer to execute service using processing of a service using node and comprising the functions of:

transmitting a service search request to a service registry for the search of a service to be used with the entire network as a target, selecting a service optimum for a purpose among service information of a search result received from said service registry to determine the service and a proxy on the corresponding owned sub-network, issuing a service request to the determined service proxy from the service using node to wait for return of a result of the service thereafter, upon return of a result of said service from said service proxy, referring to the contents to proceed with the processing, and repeating the same processing when requesting the same service again and ending the processing when the service is not used.

28. A program recorded on a computer-readable medium and executable on a general purpose computer, the program causing the computer to execute service using processing in a user side service proxy and comprising:

a function of monitoring a service request made from a node in a sub-network belonging to a service using side proxy, a function by the user side service proxy of, upon receiving a service request, interpreting the service request and after conducting predetermined message conversion, transferring the message to a provider side service proxy to which a node providing the service in question belongs and monitoring arrival of a service execution result after the transfer, and a function of, upon receiving said service execution result from said provider side service proxy, conducting message conversion to transmit the message to a service proxy designated by the service requesting side node.

29. A program recorded on a computer-readable medium and executable on a general purpose computer, the program causing the computer to execute service using processing in a provider side service proxy and comprising the functions of:

monitoring a service request made from a user side service proxy, upon receiving said service request, interpreting the service request, converting the request into a message system on the owned sub-network and transferring the message to a provider side node, thereafter monitoring arrival of a service execution result from said provider side node, and upon receiving said service execution result, converting the result into a message to transmit the message toward a service proxy designated by said service requesting node.

* * * * *

UNITED STATES PATENT AND TRADEMARK OFFICE
CERTIFICATE OF CORRECTION

PATENT NO. : 7,573,878 B2  Page 1 of 1
APPLICATION NO. : 10/691829
DATED : August 11, 2009
INVENTOR(S) : Takashi Fujimori It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1602 days.

Signed and Sealed this

Seventh Day of September, 2010

David J. Kappos
*Director of the United States Patent and Trademark Office*